(12) United States Patent
Vaidya et al.

(10) Patent No.: US 7,623,128 B2
(45) Date of Patent: Nov. 24, 2009

(54) INTERACTIVE CONSTRAINT-BASED ALIGNMENT OBJECTS

(75) Inventors: Kumud Dev Vaidya, Concord, NH (US); Michael Collingwood Rogerson, Manchester, NH (US); Bhamadipati S. Rao, Condord, NH (US)

(73) Assignee: Autodesk, Inc., San Rafael, CA (US)

( * ) Notice: Subject to any disclaimer, the term of this patent is extended or adjusted under 35 U.S.C. 154(b) by 276 days.

(21) Appl. No.: 10/953,807

(22) Filed: Sep. 29, 2004

(65) Prior Publication Data

US 2005/0088437 A1    Apr. 28, 2005

Related U.S. Application Data

(60) Provisional application No. 60/507,062, filed on Sep. 29, 2003, provisional application No. 60/507,080, filed on Sep. 29, 2003, provisional application No. 60/506,975, filed on Sep. 29, 2003, provisional application No. 60/506,974, filed on Sep. 29, 2003.

(51) Int. Cl.
    *G06T 17/00*    (2006.01)

(52) U.S. Cl. .................. 345/420; 345/619; 345/418

(58) Field of Classification Search ................ 345/441, 345/420, 418, 619
    See application file for complete search history.

(56) References Cited

U.S. PATENT DOCUMENTS

| | | | |
|---|---|---|---|
| 5,329,464 A | 7/1994 | Sumic et al. | |
| 5,371,845 A * | 12/1994 | Newell et al. | 715/808 |
| 5,553,211 A | 9/1996 | Uotani | |
| 5,555,354 A | 9/1996 | Strasnick et al. | |
| 5,990,897 A * | 11/1999 | Hanratty | 345/420 |
| 5,999,186 A * | 12/1999 | Jackson | 345/420 |
| 6,016,147 A * | 1/2000 | Gantt | 345/420 |
| 6,259,451 B1 | 7/2001 | Tesler | |
| 6,323,859 B1 * | 11/2001 | Gantt | 345/419 |
| 6,573,903 B2 * | 6/2003 | Gantt | 345/619 |
| 6,732,120 B1 | 5/2004 | Du | |
| 6,897,862 B2 * | 5/2005 | Jiang et al. | 345/420 |
| 6,907,364 B2 | 6/2005 | Poolla et al. | |
| 6,907,573 B2 * | 6/2005 | Kohls et al. | 715/764 |
| 6,912,692 B1 | 6/2005 | Pappas | |
| 6,965,945 B2 | 11/2005 | Lin et al. | |
| 7,054,741 B2 | 5/2006 | Harrison et al. | |

(Continued)

OTHER PUBLICATIONS

Kurlander et al., Interactive Constraint Based Search and Replace, ACM 1992, pp. 609-618.*

(Continued)

*Primary Examiner*—M Good Johnson
(74) *Attorney, Agent, or Firm*—Gates & Cooper LLP

(57) ABSTRACT

A computer-implemented graphics system for creating and editing interactive constraint-based alignment objects. One or more drawing entities are created in the graphics system, wherein the drawing entities are linked together as an alignment object, and one or more of the entities includes a persistent tangency rule. The drawing entities comprise lines, arcs and/or spirals, although other entities are possible. The drawing entities are then edited in the graphics system, wherein the persistent tangency rules affect the drawing entities' geometry while the drawing entities are being edited. The persistent tangency rule comprises: (1) no tangency, (2) tangency to an entity before or after, or (3) tangency to an entity before and after.

36 Claims, 18 Drawing Sheets

U.S. PATENT DOCUMENTS

| | | | |
|---|---|---|---|
| 7,164,883 B2 | 1/2007 | Rappaport et al. | |
| 7,312,802 B2 * | 12/2007 | Komornicki et al. | 345/619 |
| 2001/0049704 A1 | 12/2001 | Hamburg et al. | |
| 2003/0158668 A1 | 8/2003 | Anderson | |
| 2004/0004611 A1 * | 1/2004 | Komornicki et al. | 345/418 |
| 2004/0076279 A1 | 4/2004 | Taschereau | |
| 2005/0034075 A1 | 2/2005 | Riegelman et al. | |
| 2005/0068315 A1 | 3/2005 | Lewis et al. | |

OTHER PUBLICATIONS

Pasternak et al., Adaptable Drawing Interpretation Using Object-Oriented and Constraint-Based Graphic Specification, 1993 IEEE, pp. 359-364.*

AutoCAD tutorial, Creating a Footprint map using AutoCAD 2000 for an Aerial Photograph, pp. 1-2.*

QCAD User Reference Manual, pp. 1-9.*

Schoenstein, M., AutoCAD Land Development Desktop Release 2i, 2001, vol. 218/2001, pp. 39-42.

Gold, "Applications of dynamic voronoi data structures. In Oral Presentation," Second European Conference on Geographic Information Systems, Brussels, Belgium 1991, http://www.voronoi.com/pdfs/1990-1994/application_of_dynamic_voronoi_data_structures.pdf. Printed May 28, 2007.

Schneider et al., "GPU-friendly high-quality terrain rendering," Journal of the WSCG, vol. 14, 2006, http://wwwcg.in.tum.de/Research/data/Publications/wscg06.pdf.

Fowler et al., "Automatic extraction of irregular network digital terrain models," In Proc. ACM SIGGraph '79, pp. 199-207, 1979.

Lindstrom et al, "Visualization of large terrains made easy," In Proc. IEEE Visualization '01, pp. 363-370, 2001.

Lindstrom et al., "Terrain simplification simplified: A general framework for view-dependent out-of-core visualization," IEEE Transactions on Visualization and Computer Graphics, 8(3):239-254, 2002.

Koller et al., "Virtual GIS: A real-time 3D geographic information system," In Proc. IEEE Visualization 95, pp. 94-100, 1995.

Suter et al., "Automated generation of visual simulation databases using remote sensing and GIS," In IEEE Visualization '95, pp. 86-93, 1995.

The Voronoi Web Site 1990-1995. http://www.voronoi.com/pubs_1990.htm. Printed on May 28, 2007.

Giordan et al. "Using Adobe Photoshop 5", Jul. 1998, published by Que, copyright 1998, pp. 128, 130-131, 346-351, 361.

Blatner et al. "Essential Photoshop 6 Tips", Aug. 13, 2001, via AdobePress www.adobepress.com/articles/printerfriendly.asp?p=22789, article courtesy of PeachPit Press.

* cited by examiner

INTERACTIVE CONSTRAINT-BASED ALIGNMENT OBJECTS

CROSS-REFERENCE TO RELATED APPLICATIONS

This application claims the benefit under 35 U.S.C. Section 119(e) of the following commonly-assigned U.S. provisional patent applications, all of which are incorporated by reference herein:

Provisional Application Ser. No. 60/507,062, filed Sep. 29, 2003, by Christopher E. Putnam and Mark W. Anderson, entitled "PARCEL DESIGN AND PLANAR TOPOLOGY,";

Provisional Application Ser. No. 60/507,080, filed Sep. 29, 2003, by Sreenadha B. Godavarthy, John M. Lewis, Thomas M. Inzinga, Edward J. Connor, Robert B. Todd, Jr., and Christopher E. Putnam, entitled "SURFACE PROCESSING,";

Provisional Application Ser. No. 60/506,975, filed Sep. 29, 2003, by Kumud Dev Vaidya, Michael C. Rogerson, and Bhamadipati S. Rao, entitled "HORIZONTAL ALIGNMENT PROCESSING,"; and Provisional Application Ser. No. 60/506,974, filed Sep. 29, 2003, by Kumud Dev Vaidya, Michael C. Rogerson, and Bhamadipati S. Rao, entitled "VERTICAL ALIGNMENT PROCESSING,".

This application is related to the following co-pending and commonly-assigned patent applications, all of which are incorporated by reference herein:

Utility application Ser. No. 10/954,526, filed on Sep. 29, 2004, by Christopher E. Putnam and Mark W. Anderson, entitled "METHOD FOR DYNAMICALLY UPDATING A PLANAR TOPOLOGY,";

Utility application Ser. No. 10/953,806, filed on Sep. 29, 2004, by Sreenadha B. Godavarthy and John M. Lewis, entitled "SURFACE SMOOTHING TECHNIQUES,"

Utility application Ser. No. 10/954,542, filed on Sep. 29, 2004, by Christopher E. Putnam and Mark W. Anderson, entitled "METHOD AND APPARATUS FOR AUTOMATICALLY DISCOVERING HIERARCHICAL RELATIONSHIPS IN PLANAR TOPOLOGIES,"

Utility application Ser. No. 10/954,542, filed on Sep. 29, 2004, by Christopher E. Putnam and Mark W. Anderson, entitled "INTERACTIVE METHOD FOR DESIGNING PARCELS,"

Utility application Ser. No. 10/953,934, filed on Sep. 29, 2004, by John M. Lewis, Thomas M Inzinga and Edward J. Connor, entitled "INTERACTIVE TRIANGULATED IRREGULAR NETWORK (TIN) SURFACES DESIGN,"

Utility application Ser. No. 10/953,245, filed on Sep. 29, 2004, by John M. Lewis, Robert B. Todd, Jr., Edward J. Connor, and Christopher E. Putnam, entitled "SURFACE CONSTRUCTION AUDIT TRAIL AND MANIPULATION,".

BACKGROUND OF THE INVENTION

1. Field of the Invention

The present invention relates generally to computer aided design (CAD) applications and geographic information systems (GIS), and in particular, to the creation and editing of interactive constraint-based alignment objects in a computer-implemented graphics system.

2. Description of the Related Art

Computer aided design (CAD) applications are traditionally used for creating and editing drawings (e.g., maps, floor plans, and engineering designs). Further, CAD applications enable users to create/modify highly precise and accurate drawings/maps. Civil engineers and surveyors, for whom precision and accuracy are of primary importance, have adopted CAD applications to speed data input and perform computations for design projects.

Geographic information systems (GIS) have been traditionally used for spatial analysis and mapping and allow users to store, retrieve, manipulate, analyze, and display geographically referenced data. However, traditional GIS have been aimed at general cartography and broad land-use analysis, and not precision design for the construction and management of real-world projects. In this regard, the geometric precision that many engineers require has not been provided by traditional GIS systems. Some GIS companies have attempted to use complex databases to model real-world objects. However, such databases are still built on points, lines, and polygons and cannot store geometric objects used in traditional CAD applications (e.g., true arcs or road spirals).

Many organizations have used both CAD and GIS tools in different departments to utilize the different specific features available. Further, data from original CAD drawings may be frequently imported or digitized for use in the GIS mapping environment. However, because of the limitations of GIS systems and/or CAD systems, during such a transition, data connectivity, accuracy, and geometric precision are often lost. Accordingly, what is needed is an integrated solution that provides the functionality and tools of a GIS system with the precision and accuracy of a CAD application.

In an attempt to address the above concerns, industry specific components were built on top of the CAD engine to address specialized needs and eventually, an integrated solution was developed (e.g., the AUTODESK LAND suite of software, including AUTOCAD, AUTODESK MAP, AUTODESK LAND DESKTOP and AUTODESK CIVIL DESIGN, all of which are available from the assignee of the present invention). Integrated solutions attempt to provide GIS functionality (e.g., multi-user editing, polygon overlay and analysis, topology, thematic mapping, etc.) within a CAD application and spatial database. The integrated solution allows civil engineers the ability to integrate the precision engineering tasks (from CAD) (e.g., site, roadway, and hydrological design) with the spatial analysis tools and data management of GIS. Such systems are known as CAD/GIS systems.

Nonetheless, the integrated solutions may have various limitations with regard to creating alignments between objects and then editing those alignments. In this regard, alignments are more of a "baseline" with which to reference design locations and lengths, for example, the centerline of a roadway in a CAD/GIS system.

What is needed in the art are improved techniques for creating and editing alignments between objects in CAD/GIS systems. The present invention satisfies those needs.

SUMMARY OF THE INVENTION

The present invention describes a method, apparatus and article of manufacture for creating and editing interactive constraint-based alignment objects in a computer-implemented graphics system. One or more drawing entities are created in the graphics system, wherein the drawing entities are linked together as an alignment object, and each of the drawing entities may include a persistent tangency rule. The drawing entities comprise lines, arcs or spirals, although other entities are possible. The drawing entities are then edited in the graphics system, wherein the persistent tangency rules affect the drawing entities' geometry while the drawing entities are being edited. The persistent tangency rule comprises: (1) no tangency, (2) tangency to an entity before or after, or (3) tangency to an entity before and after.

Tangency rule (1) describes "fixed entities." A fixed entity is not dependent on tangency to any other entity to define its geometry. Specifically, a geometric definition of the fixed entity has no dependency on any other entities, but other entities can depend on the fixed entity.

Tangency rule (2) describes "floating entities." A floating entity is dependent on tangency to one other entity before or after to define its geometry. Specifically, a geometric definition of the floating entity includes a tangency dependency on one other entity before or after. Other floating or free entities may be dependent on the floating entity.

Tangency rule (3) describes "free entities." A free entity is dependent on tangency to two other entities before and after to define its geometry. Specifically, a geometric definition of the free entity includes a tangency dependency on one entity before and one entity after. No other entities are dependent on the free entity, and editing the free entity does not directly affect the geometry of the entities to which it is attached.

Finally, each of the drawing entities may include other persistent attributes related to how the drawing entity was created.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention describes the creation and editing of interactive constraint-based alignment objects in a computer-implemented graphics system, wherein the alignment objects are comprised of linked drawing entities that include persistent tangency rules.

Hardware and Software Environment

Figure 1:
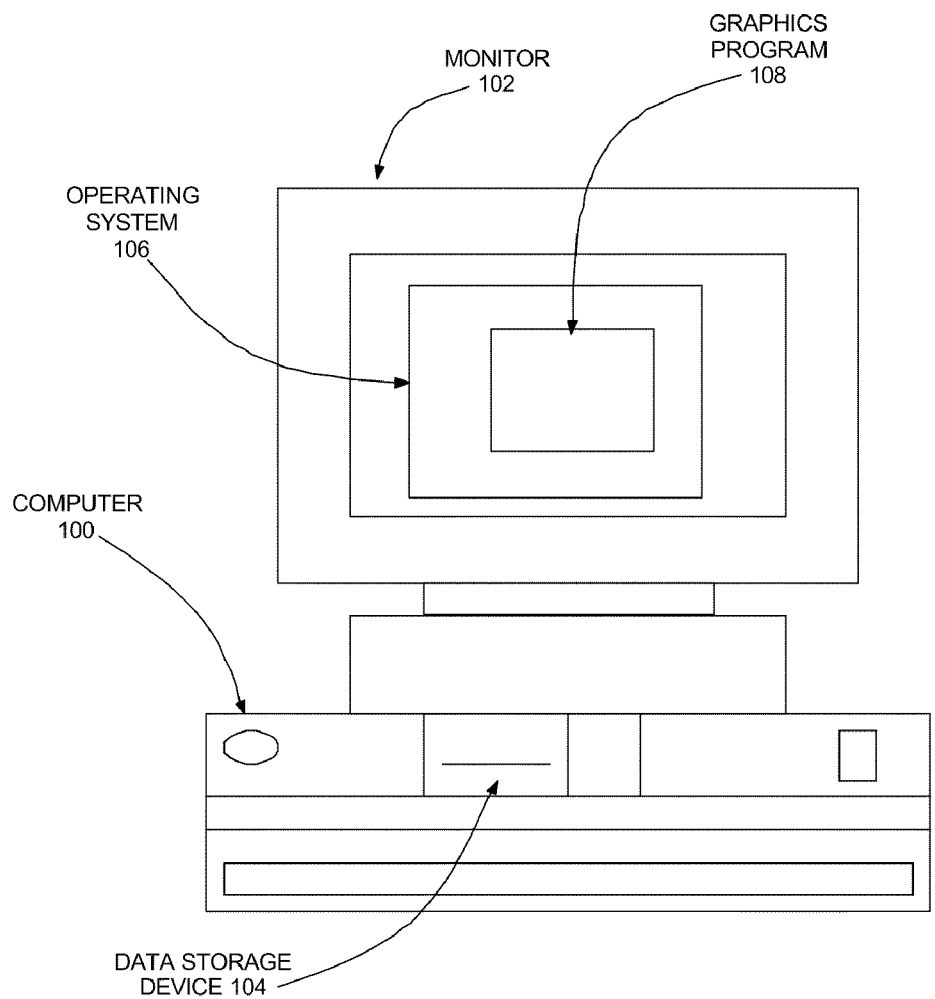
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106. The graphics program 108 preferably comprises a CAD/GIS program, although other graphics programs 108 could be used as well.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Alignment Objects

Alignment objects are created in the graphics program 108 using a two-step process. First, drawing entities, such as lines, arcs (also known as curves) and/or spirals, are created. Second, the drawing entities are linked together as an alignment object, wherein each entity may include a persistent tangency rule. The rule may be (1) no tangency (a fixed entity), (2) tangency to an entity before or after (a floating entity), or (3) tangency to an entity before and after (a free entity). In addition, each entity includes other persistent attributes that describe how the entity was created.

Fixed Entity

A fixed entity has no tangency rules to define its geometry, and thus is not dependent on tangency to any other entity to define its geometry. Although the geometric definition of a fixed entity has no dependency on any other entities, other entities can may depend on it.

Instead, the fixed entity is defined by constraints or parameters that define the entity geometrically, wherein these constraints can be edited by the user. There must always be a sufficient number of constraints to define an entity, but there cannot be too many such that constraints might conflict (over constrained).

There are a number of ways to define a fixed line, arc or spiral. For example, an arc can be defined by three pass-through points, a center point and a radius, wherein a pass-through point is a point that defines an entity, such that the entity (line, arc or spiral), is defined by the points that it passes through.

Length is not really considered in the definition of the fixed entity, because it can be affected by other entities that are dependent on it. For example, a fixed line defined by two pass-through points has a definitive length by itself, but when another entity becomes dependent on it, the length of the line can vary, depending on the solved point of tangency on the line.

Floating Entity

A floating entity has a tangency rule on one side and thus is partially dependent on another entity to define its geometry. More specifically, a floating entity is dependent on tangency to one other entity (before or after) to define its geometry. Other entities (either floating or free entities) can also be dependent on it.

The tangency rule may be supplemented by additional parameters depending on the type of free entity, i.e., line, arc or spiral, to fully define its geometry, which are supplied by the user.

As with the fixed entity, length is not really considered in the definition of the floating entity (unless that particular entity type specifically uses length in its definition, or specifically uses the endpoint of a entity it is attached to), because it can be affected if another entity is dependent on it. For example, the length of floating arc attached to a fixed line may itself have a length from the point for tangency to the pass-through point for the arc. However, as soon as another entity is attached (dependent) to the floating arc, the beginning point of curvature and the ending point of tangency define the length of the floating arc.

Free Entity

The geometric definition of a free entity is dependent on tangency to two other entities (before and after). No other entities can be dependent on a free entity. This may be supplemented by additional parameters depending on the type of free entity, i.e., line, arc or spiral, to fully define its geometry.

For example, a free line has tangency rules on both sides and thus is completely dependent on the entities attached to it to define its geometry.

In another example, a free arc has tangency rules on both sides and thus is partially dependent on these entities to define its geometry. The user must supply the other parameters necessary to fully define its geometry, including a pass-through point or a radius. If the radius is specified, there are multiple solutions for the free arc, and thus additional parameters need to be specified, including the arc is compound or reverse and/or whether the included angle of the arc is greater than 180 degrees.

Editing a free entity will not directly affect the geometry of the entities that it is attached to, with the exception of length.

Specific Examples of Floating and Free Entities

The following sections describe specific examples of floating and free entities that may be created by the graphics program 108.

Floating Arc—Point and Radius

A floating arc may be attached to either another floating or fixed arc or a floating or fixed line. In each case, there are a number of possible solutions. The parameters that must be supplied by the user is the radius, pass-through point, and whether the arc is greater or less than 180 degrees. The pass-through point determines what side of the entity the arc is on (and if it is compound/reverse when attached to another arc).

Figure 2:
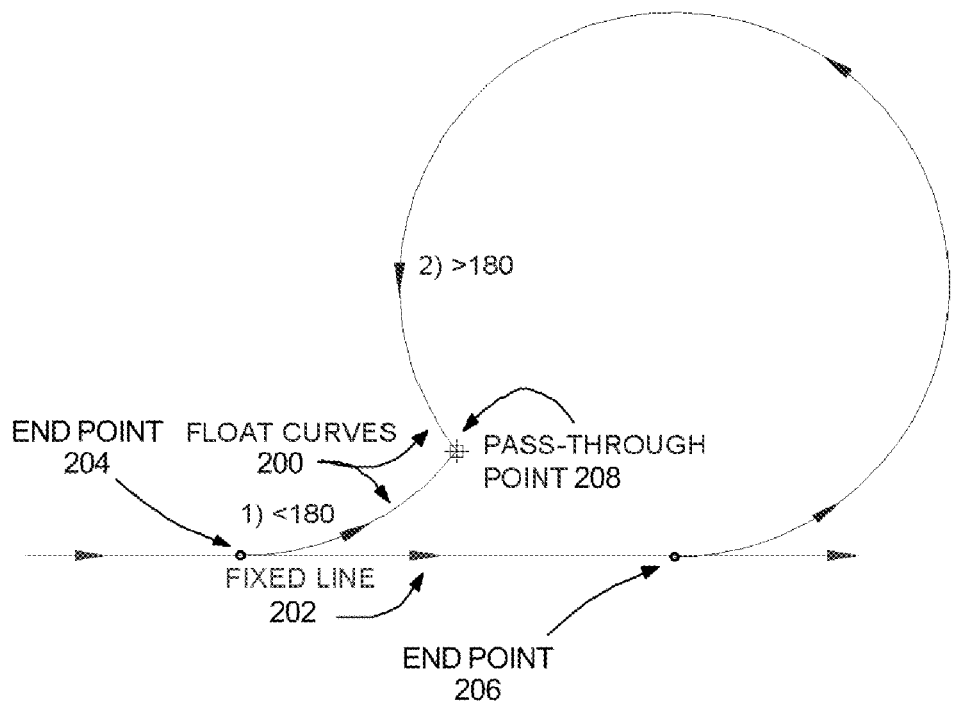
FIG. 2 illustrates a floating arc from a fixed line.

FIG. 2 illustrates a floating arc 200 from a fixed line 202, and shows two possible solutions for the floating arc 200 for a given radius and point. The fixed line 202 has two end points 204 and 206. The floating arc 200 is defined by pass-through point 208 and the two possible solutions: 1) for less than 180 degrees and 2) for greater than 180 degrees.

Figure 3:
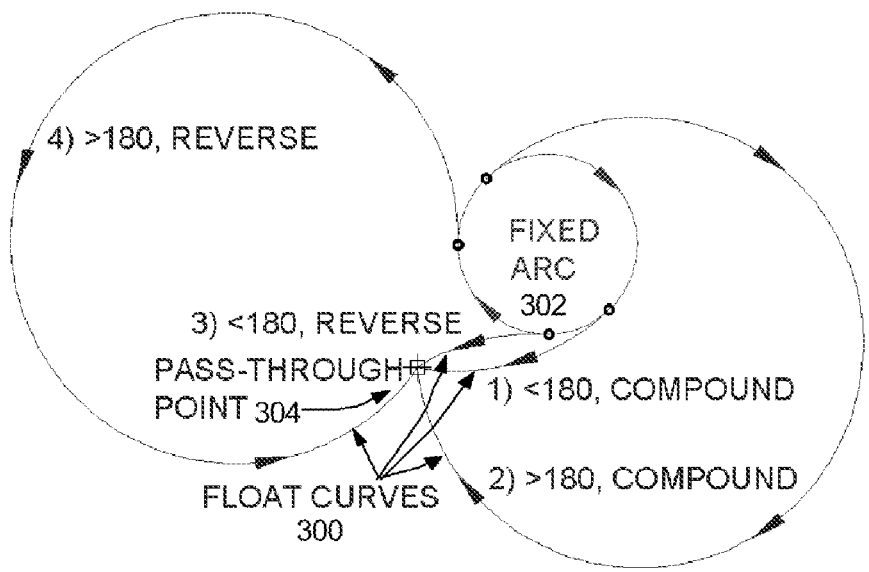
FIG. 3 illustrates a floating compound arc from a fixed arc.

FIG. 3 illustrates a floating compound arc 300 from a fixed arc 302, and shows four possible solutions for the floating compound arc 300 a given radius and point. The fixed arc 302 has four floating arcs 304 attached thereto using a give radius and pass-through point 304. The four solutions are shown as: 1) for less than 180 degrees, compound; 2) for greater than 180 degrees, compound; 3) for less than 180 degrees, reverse; and 4) for greater than 180 degrees, reverse.

Figure 4:
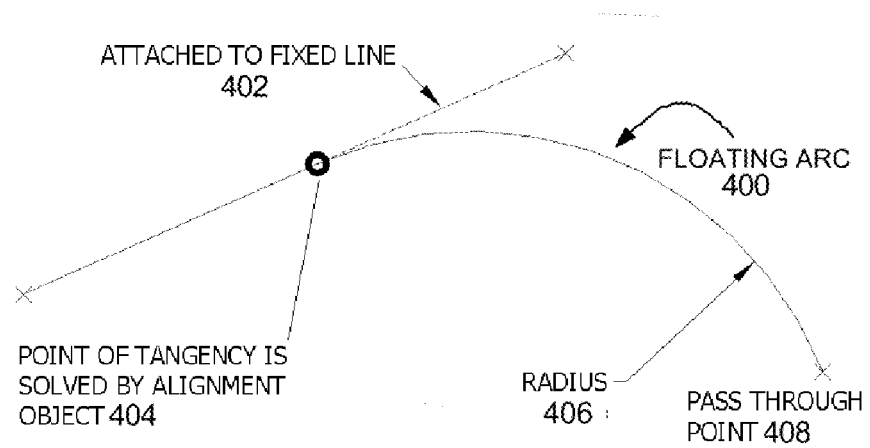
FIG. 4 illustrates a floating arc with an attachment entity.

FIG. 4 illustrates a floating arc 400 with an attachment entity (i.e., a fixed line) 402, point of tangency 404, radius 406, and pass-through point 408, and less than 180 degrees. The radius 406 or pass-through point 408 can be edited, modifying the arc 400 definition. Also, the fixed line 402 can be edited, modifying the point of tangency 404 location. Modifying any one of the parameters will not modify the others, except for the point of tangency location 404 on the line 402.

Figure 5:
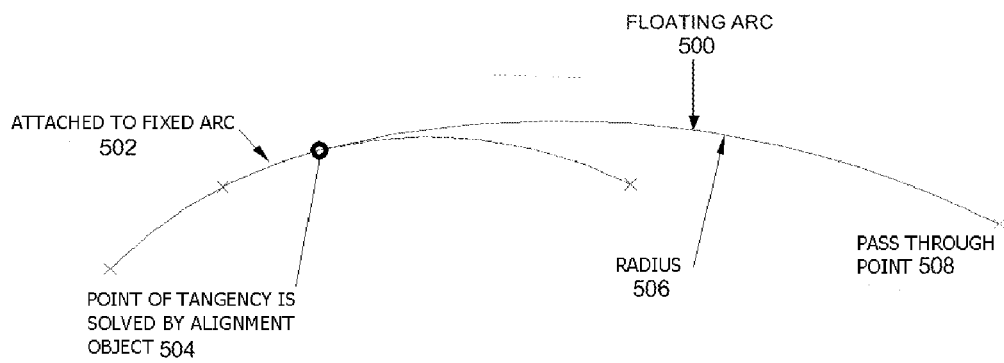
FIG. 5 illustrates a floating arc with an attachment entity.

FIG. 5 illustrates a floating arc 500 with an attachment entity (i.e., a fixed arc) 502, point of tangency 504, radius 506, pass-through point 508, less than 180 degrees and compound to the arc 500. The radius 506 or pass-through point 508 can be edited, modifying the arc 500 definition. Also, the fixed arc 502 can be edited, modifying the point of tangency 504 location. Modifying any one of the parameters will not modify the others, except for the point of tangency 504 location on the arc 502.

Figure 6:
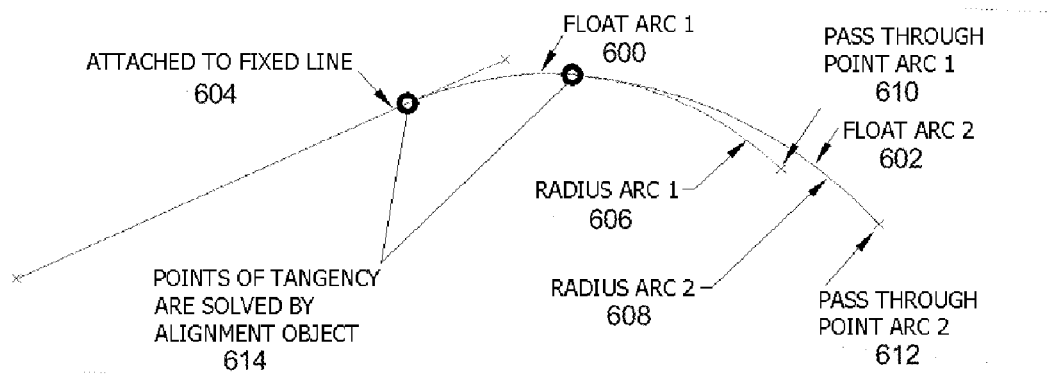
FIG. 6 illustrates two floating arcs with an initial attachment entity.

FIG. 6 illustrates two floating arcs 600 and 602 with an initial attachment entity (i.e., a fixed line) 604. The first floating arc 600 is tangent to the fixed line 604 and the second floating arc 602 is tangent to the first floating arc 600. The first floating arc 600 includes radius 606 and the second floating arc 602 includes radius 608. The first floating arc 600 includes pass-through point 610 and the second floating arc 602 includes pass-through point 612. The two points of tangency, from the first floating arc 600 to the fixed line 602 and from the second floating arc 602 to the first floating arc 600, are indicated as 614. Both floating arcs 600 and 602 are less than 180 degrees and the second floating arc 602 is compound.

Floating Arc—Entity End and Point

Figure 7:
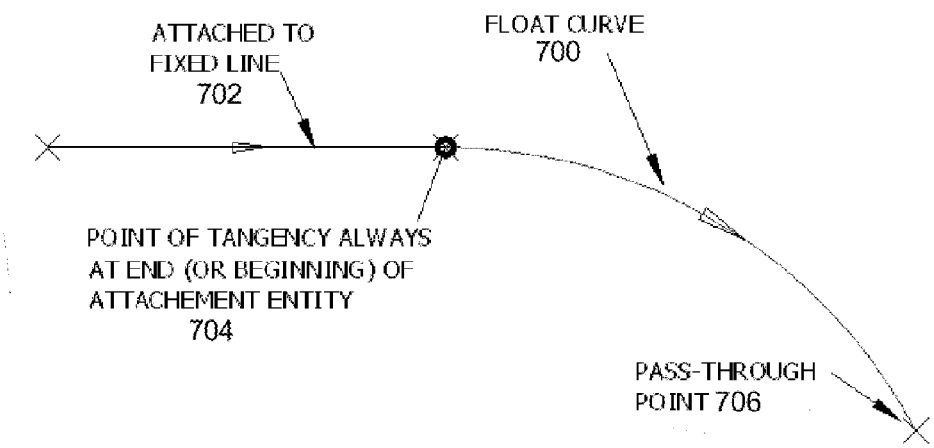
FIG. 7 illustrates a floating arc from an attachment entity.

FIG. 7 illustrates a floating arc 700 from an attachment entity (i.e., a fixed line) 702 end, which is the point of tangency 704, through a pass-through point 706.

When appended to an entity 702, this type of floating arc 700 has the point of tangency 704 at the end of the entity 702 it is attached to (while being tangent to it) and passes through a specified point 706. If pre-pended to the attachment entity 702, it ends at the start point of the entity 702 it is attached to (while being tangent to it) and passes through a specified point 706.

The parameters that define this entity 700 do not include a radius, since all parameters are provided by the tangency rule, and the point of tangency 704 and pass-through point 706 fully define the geometry of the arc 700. The radius is a by-product of the solution. The parameters that define the arc are:

1. Point of tangency 704 and direction at that point (coming for the end of the entity 702 it is attached to).

2. Pass-through point 706 at the other end (as specified by the user).

Floating Arc Creation

There are three methods to create a floating arc: two methods to create a floating arc by point and radius, and one method to create a floating arc by entity end and point. The prompts may be different depending on what entity they select to attach to (line or arc):

1. Specify Attachment Entity, Radius And Pass-Through Point. The user selects the entity to attach to, and specifies the radius, as well as whether the curve solution angle is less than 180 or greater than 180. If the attachment entity is an arc, the user is prompted to identify whether the curve is compound or reverse to curve before. Finally, the user specifies an end point.

2. Specify Attachment Entity, Pass-Through Point And Direction. This method requires the user specify the attachment entity, pass-through point and a direction at the pass-through point. The direction is used to solve for the radius, and the end result of this method is a floating arc by radius and pass-through point. The user selects an entity to attach to, and specifies an end point and a direction at the end point.

3. Specify Attachment Entity End, Pass-Through Point. This is a special type of floating arc entity, where the endpoint of the entity being attached to will always be at the start point for this floating arc entity, and it will always maintain tangency. The user selects an entity to attach to, and specifies a pass-through point.

In all three methods, a floating arc entity is created that starts at the end of the entity to which it was attached. Note that floating entity solutions can be pre-pended or appended to fixed or floating entities.

Floating Arc Editing

For a radius and pass-through point type, the radius or pass-through point can be edited, thereby modifying the arc definition. Also, the attachment entity can be edited, modifying the point of tangency location. Modifying any one of the parameters will not modify the others, except for the point of tangency location.

For an entity attachment end and pass-through point type, the pass-through point can be modified. This will result in a modification of the radius and length. Also, the attachment entity can be edited, modifying the point of tangency location. Modifying any one of the parameters will not modify the others, except for the point of tangency location.

Floating Lines

A floating line may only be attached to a floating or fixed arc.

Figure 8:
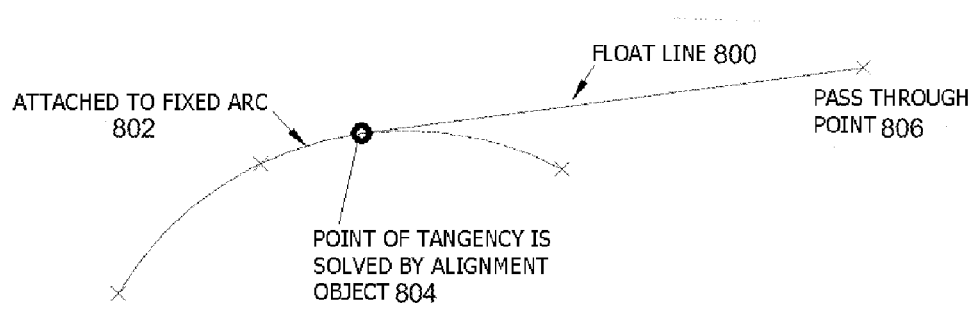
FIG. 8 illustrates a floating line with an attachment entity.

FIG. 8 illustrates a floating line 800 with an attachment entity (i.e., a fixed arc) 802, point of tangency location 804 and pass-though point 806.

Figure 9:
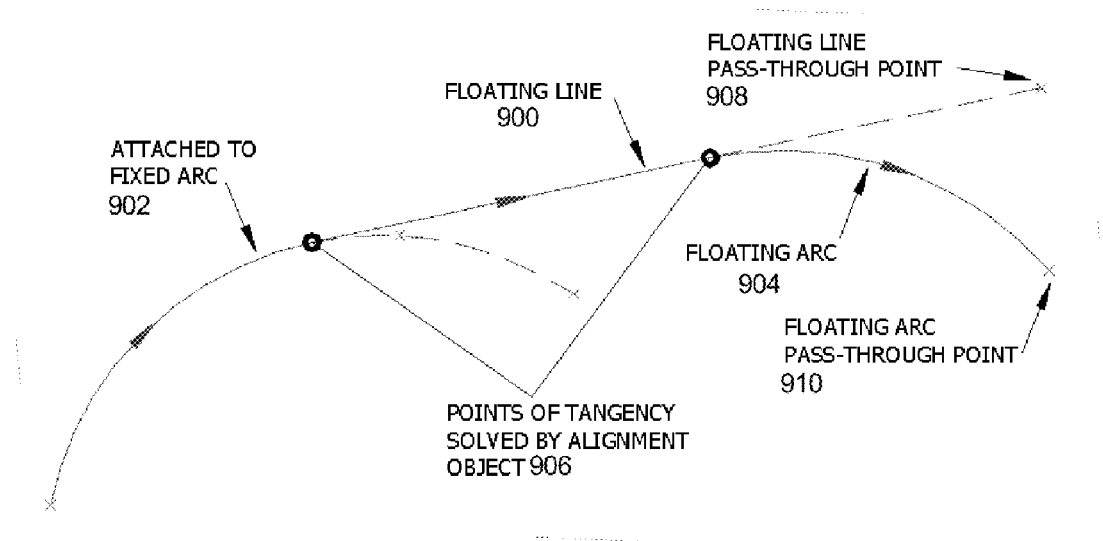
FIG. 9 illustrates a floating line with an attachment entity.

FIG. 9 illustrates a floating line 900 with an attachment entity (i.e., a fixed arc) 902, floating arc 904, point of tangency locations 906, pass-through point for the floating line 908 and pass-through point for the floating 904.

Figure 10:
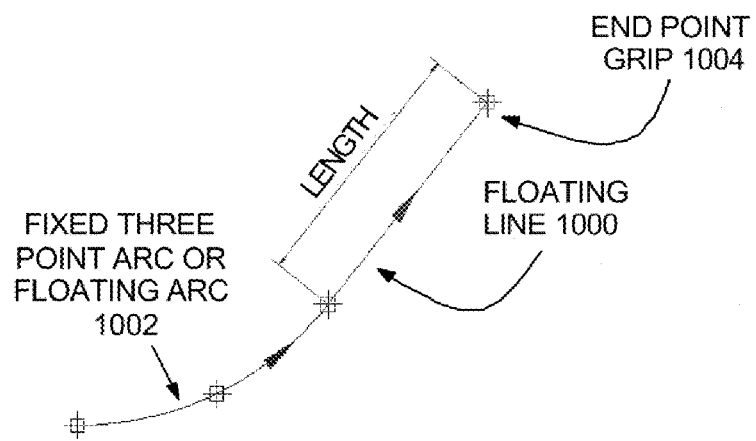
FIG. 10 illustrates a floating line with a specified attachment entity.

FIG. 10 illustrates a floating line 1000 with a specified attachment entity (i.e., fixed three-point arc or floating arc) 1002, with an end-point grip 1004.

Floating Line Creation

There are two types and one method each to create floating lines:

1. Specify Attachment Entity, Pass-Through Point. In this method, the user selects an entity to attach to, and specifies an end point. Thereafter, a floating line alignment entity is created.

2. Specify Attachment Entity, Length. This is a special type of floating line that always honors the endpoint (and tangency at the endpoint) of the arc it is being attached to. The other end of the line is determined by a length parameter. This type is useful when the user needs a tangent where they can explicitly specify the length, and honors the geometry of the previous entity, including the length of the previous entity.

The user selects an entity to attach to (which must be a three point fixed or a floating arc with no attachment on the end selected), and then specifies a length.

A rubber band is drawn from the end of the entity that the line is being drawn from to the cursor. At the same time, a preview of the line off the end of the entity selected will be shown. If "Match" is selected, no rubber band will appear.

Thereafter, a floating line alignment entity is created.

Floating Line Editing

For a pass-through point type, the pass-through point can be edited, modifying the line definition and point of tangency location. Also, the fixed arc (or floating arc) it is attached to can be edited, modifying the point of tangency location.

For an entity attachment end and length type, the length can be modified. Also, the attachment entity can be edited, modifying the point of tangency location.

Free Lines

Figure 11:
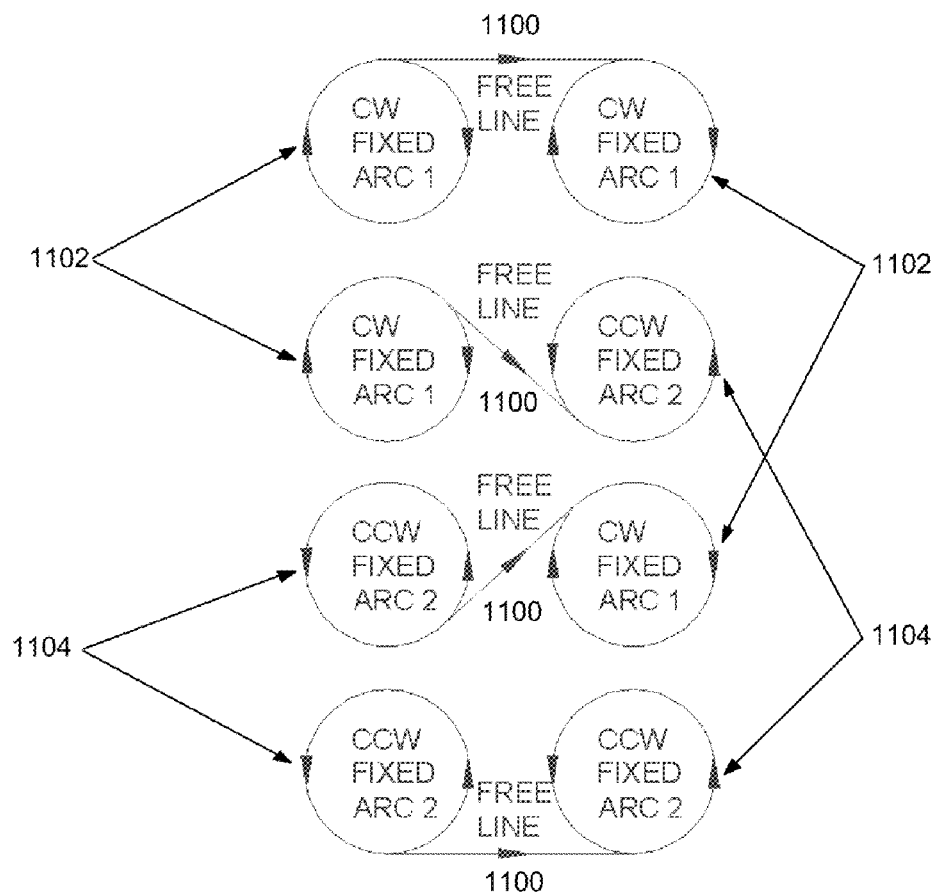
FIG. 11 illustrates free lines, which are attached to clockwise (CW) fixed arcs and counter-clockwise (CCW) fixed arcs.

FIG. 11 illustrates free lines 1100, which are attached to clockwise (CW) fixed arcs 1102 and counter-clockwise (CCW) fixed arcs 1104, and no other input is required. As shown in FIG. 11, there are four possible solutions, depending on the direction of the arcs 1102 and 1104.

A free line 1100 may be attached to any combination of two fixed or floating arcs 1102 and 1104. A free line 1100 cannot be attached to another line, because there is no tangency rule to solve. There are no other parameters the user needs to specify for the line 1100 to be solved.

Free Line Creation

There is only one method to create a free line:

1. Free Line Between Two Arcs (Specify Arc Before And After). The user selects an entity before to attach to (which must be a free/floating arc with no entity already attached to the outgoing end), and then selects an entity after to attach to (which must be a free/floating arc with no entity already attached to the incoming end). When completed, a free line alignment entity is created.

Free Line Editing

Note that there are no direct editing operations for the line. The arcs can be moved, affecting the direction/length of the line.

Free Arcs

A free arc may be attached to any combination of fixed or floating lines or arcs. The following are examples of a free arc attached between:

1. Two lines,
2. An arc and a line, and
3. Two arcs.

Free Arc Between Two Lines

Figure 12:
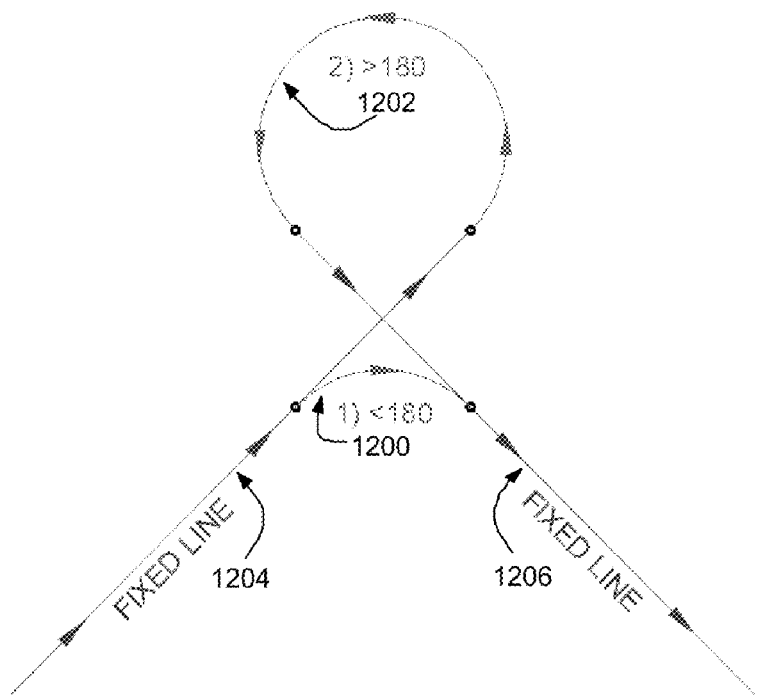
FIG. 12 illustrates two free arcs between two lines.

FIG. 12 illustrates two free arcs 1200 and 1202 (with the same radius) between two lines 1204 and 1206, wherein the lines 1204 and 1206 are either floating or fixed.

A free arc 1200, 1202 connected to lines 1204, 1206 on both ends has only one unique solution if a pass-through point is specified. If the radius is specified, as shown in FIG. 12, two possible solutions exist, wherein the solution is dependent on specifying 1) whether the included angle of the arc 1200 is less than 180 degrees; or 2) whether the included angle of the arc 1202 is greater than 180 degrees.

Free Arc Between Two Lines Creation

There are two methods for creating a free arc between two lines:

1. Free Arc Between Two Lines By Radius: Specify Arcs, Radius, Less Than 180 Degrees Or Greater Than 180 Degrees. In this method, the user selects an entity before to attach to, and then selects an entity after to attach to. A solution angle may be specified (i.e., less than or greater than 180 degrees), or a default of less than 180 degrees may be used.

Finally, the user specifies a radius. In this particular case, there is no automatic rubber-band. The user can type a radius value, or select two points on the screen to specify the radius. The arc preview will only occur if they have selected the first point on the screen, either by picking or by entering a coordinate, then as a rubber band is drawn to the cursor from the selected point, the arc preview appears. The user is then prompted to specify a second point. When the above prompts are satisfied, the free arc is drawn.

For a spiral-arc-spiral fit only, there is no arc preview, and the following additional prompts are issued: (1) specify spiral in length, and (2) specify spiral out length.

2. Free Arc Between Two Lines: Specify Entity Before And After And Pass-Through Point. In this method, the user selects an entity before to attach to (i.e., a line is selected), selects an entity after to attach to (i.e., a line is selected), and specifies a pass-through point.

Since there is only one unique solution for any given pass-through point, no other prompts are necessary and a screen preview is possible. The point entered can be a 2D coordinate input, either directly, or through the use of transparent commands.

Free Arc Between Two Lines Editing

The following described the editing of the arc. For an arc through a pass-through point, the pass-through point can be modified to determine the location and radius of the arc. For an arc determined by the radius and the included angle less than or greater than 180 degrees, the radius can be edited, and the less than or greater than 180 degrees condition can be modified, which determines what the solution is, as shown in FIG. 11.

In either case, editing either lines affects the location of the arc. If the arc is defined by radius, the radius is held while the lines are being edited. If the arc is defined by a pass-through point, the pass-through point is held while the lines are being edited.

Free Arc Between a Line and an Arc

Figure 13:
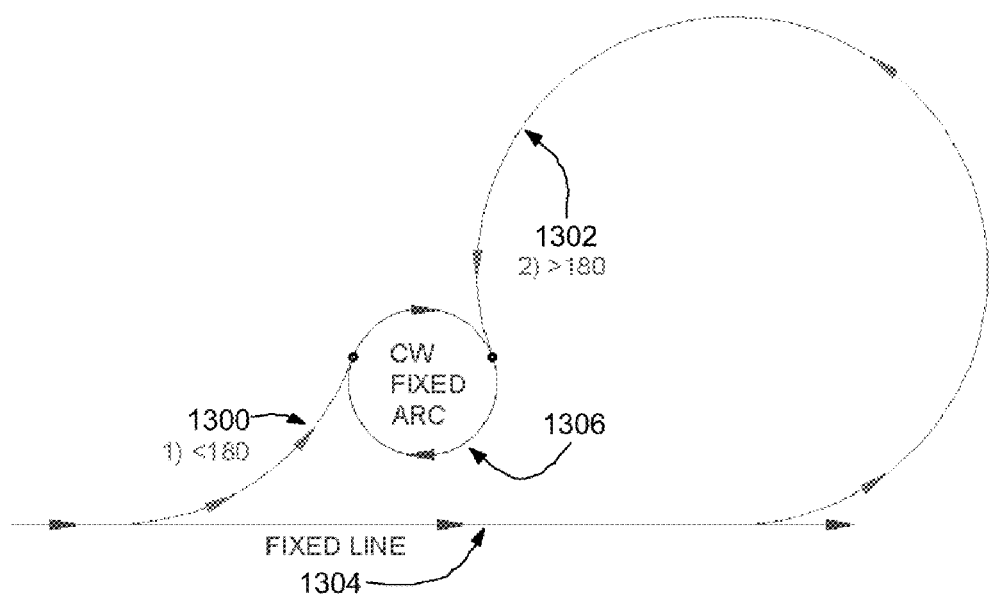
FIG. 13 illustrates two free arcs between a line and a clockwise (CW) arc.
Figure 14:
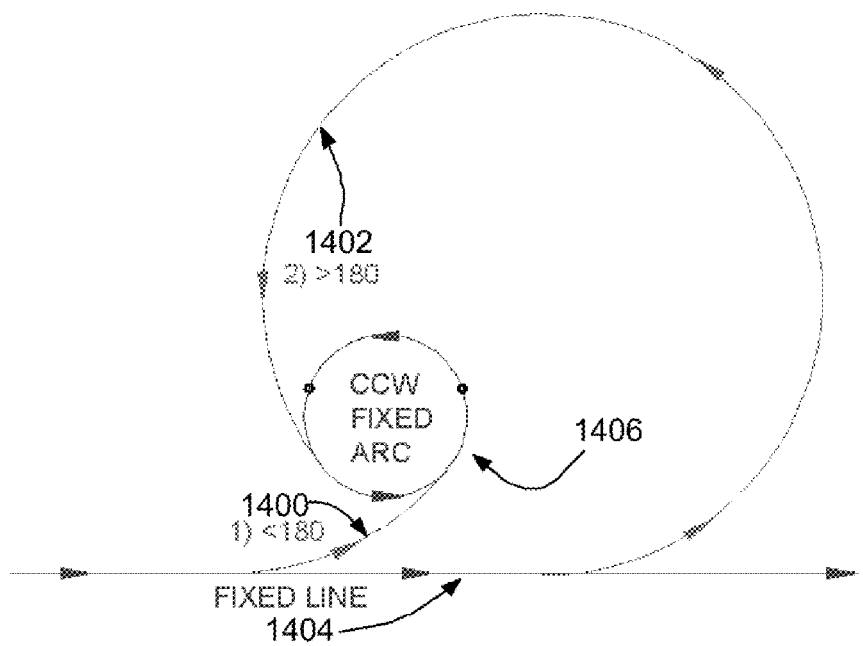
FIG. 14 illustrates two free arcs between a line and a counterclockwise (CCW) arc.

FIG. 13 illustrates two free arcs 1300 and 1302 (with the same radius) between a line 1304 and a clockwise (CW) arc 1304. FIG. 14 illustrates two free arcs 1400 and 1402 (with the same radius) between a line 1404 and a counterclockwise (CCW) arc 1406.

If a free arc is connected to a line on one side, and an arc on the other, four solutions exist, depending on whether the specified included angle of the arc is greater that 180 degrees or less than 180 degrees, and whether the free arc is reverse or compound to the existing arc it is being attached to. The solutions also change with the direction of the arc and on what side of the line it lays. For an arc through a pass-through point, either solution is possible and is unique to the location of the pass-through point.

Free Arc Between a Line and an Arc Creation

There are two methods to create a free arc between an arc and a line: (1) by specifying a radius and (2) by specifying a pass-though point. In the method where a radius is supplied, other parameters must be supplied to identify a unique solution.

The methods are described in more detail below:

1. Free Arc Between An Arc And A Line By Radius: Specify Arcs, Radius, Less Than 180 Degrees Or Greater Than 180 Degrees And Reverse Or Compound To The Existing Arc. The user selects an entity before to attach to (i.e., an arc or line is selected), selects an entity after to attach to (i.e., an arc or line is selected), selects an arc solution angle of less than 180 degrees or greater than 180 degrees, selects whether the arc is compound or reverse to the existing arc, and specifies the radius.

In this particular case, there is no automatic rubber-band. The user can type a radius value in, or select two points on the screen to specify the radius. The arc preview only occurs if they have selected the first point on the screen, either by picking or by entering a coordinate, then as a rubber band is drawn to the cursor from the selected point, the arc preview appears. The user then specifies a second point, which can be a 2D coordinate input, either input directly or through the use of transparent commands.

2. Free Arc Between A Line And An Arc, Specify Entity Before And After And Pass-Through Point. The user selects an entity before to attach to (i.e., an arc or line is selected), selects an entity after to attach to (i.e., an arc or line is selected), and specifies a pass-through point.

Since there is only one unique solution for any given pass-through point, no other prompts are necessary and a screen preview is possible. The point entered can be a 2D coordinate input, either directly, or through the use of transparent commands.

Free Arc Between a Line and an Arc Editing

For an arc through a pass-through point, the pass-through point can be modified to determining the location and radius of the arc.

For an arc determined by radius and an included angle less than or greater than 180 degrees, the radius can be edited, and the included angle less than or greater than 180 degree condition can be modified, which will determine what the solution is as shown above.

In either case, editing the line or arc that the free arc is attached to affects the location of the arc. If the arc is defined by radius, the radius is held while the attached line or arc is being edited. If the arc is defined by a pass-through point, the pass-through point is held while line or arc is being edited.

Free Arc Between Two Arcs

Figure 15:
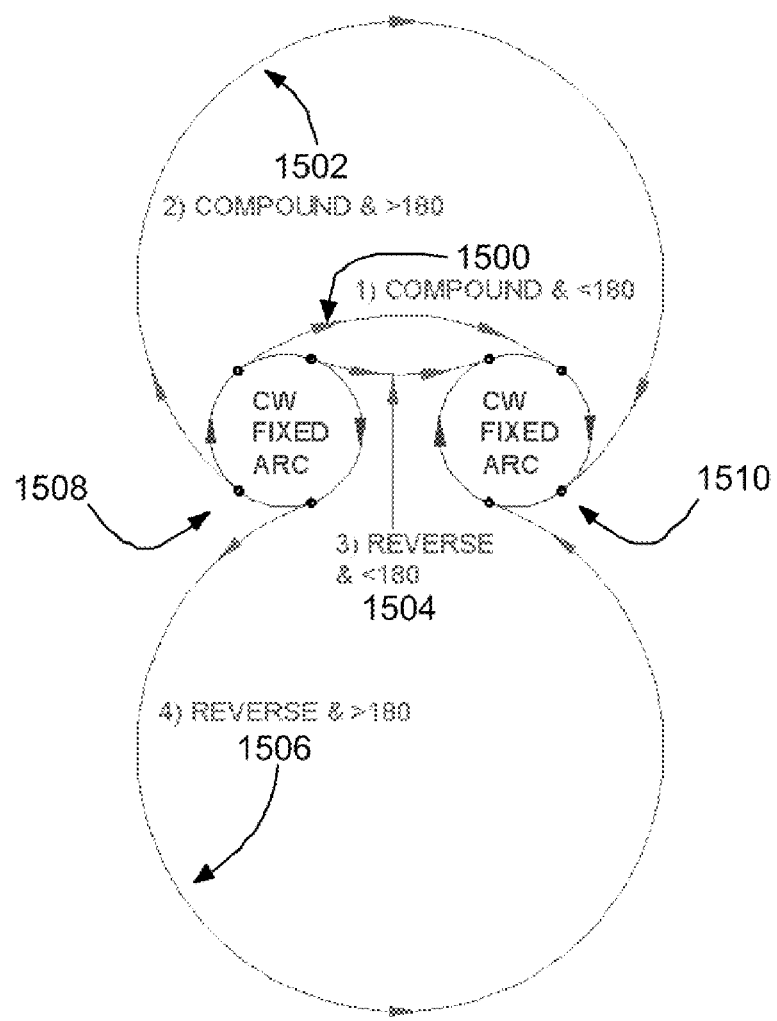
FIG. 15 illustrates four possible free arcs between two fixed clockwise (CW) arcs.

FIG. 15 illustrates four possible free arcs 1500, 1502, 1504 and 1506 between two fixed clockwise (CW) arcs 1508 and 1510.

In the case where a free arc is attached to two arcs, there are four possible solutions, depending on the specified included angle (greater than 180 degrees, or less than 180 degrees) and also the curve direction (reverse or compound). For an arc through a pass-through point, four solutions are possible and are unique to the location of the pass-through point, so the user does not need to specify any additional parameters.

The following examples illustrate all possible combinations for two situations: (1) where both attachment arcs are in the same direction, and (2) where the attachment arcs are in opposite directions.

In FIG. 15, the following summarizes the controls used to specify what solution is desired:

1. Curve is less than 180 degrees:
   a) Compound to first arc, and
   b) Reverse to first arc.
2. Curve is greater than 180 degrees:
   a) Compound to first arc, and
   b) Reverse to first arc.

Figure 16:
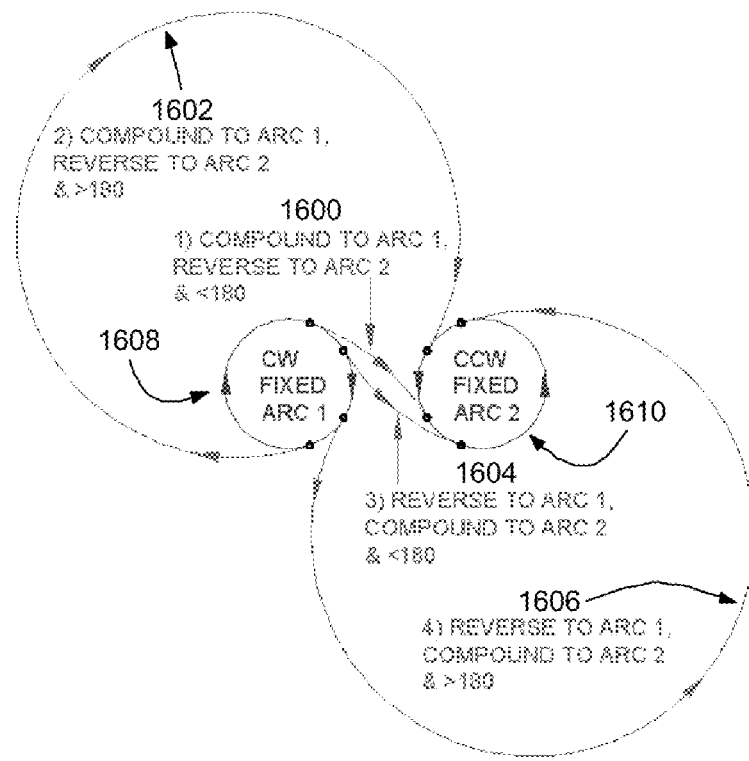
FIG. 16 illustrates four free arcs between fixed CW and CCW arcs.
Figure 17:
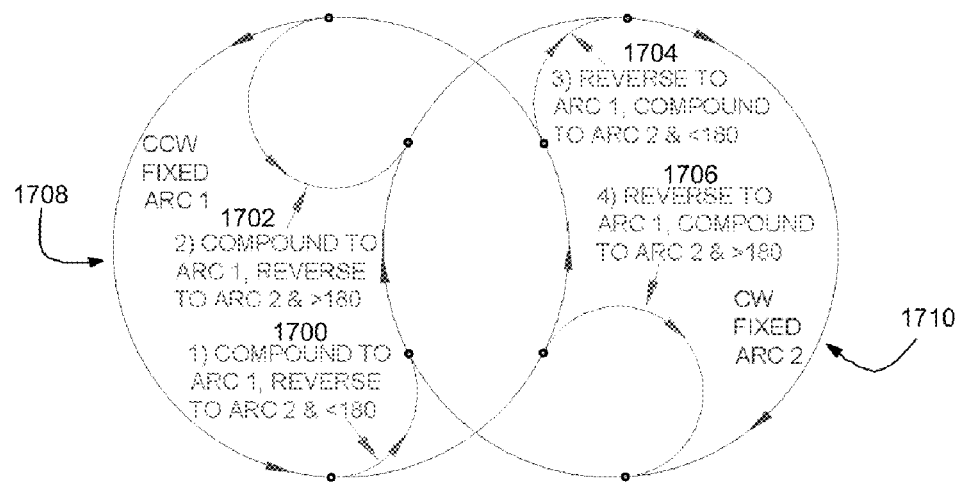
FIG. 17 illustrates four free arcs between overlapping fixed CW and CCW arcs.

FIG. 16 illustrates four free arcs 1600, 1602, 1604 and 1606 between fixed CW and CCW arcs 1608 and 1610. FIG. 17 illustrates four free arcs 1700, 1702, 1704 and 1706 between overlapping fixed CW and CCW arcs 1708 and 1710.

In FIGS. 16 and 17, the following summarizes the controls used to specify what solution is desired:

1. Curve is less than 180 degrees:
   a) Compound to first arc, and
   b) Reverse to first arc.
2. Curve is greater than 180 degrees:
   c) Compound to first arc, and
   d) Reverse to first arc.

Free Arc Between Two Arcs Creation

There are two methods to create a free arc between two arcs: (1) by specifying a radius and (2) by specifying a pass-though point. In the method where the radius is supplied, other parameters must be supplied to identify a unique solution.

1. Free Arc Between Two Arcs By Radius: Specify Arcs, Radius, Less Than 180 Degrees Or Greater Than 180 Degrees And Reverse Or Compound To First Arc. The user selects an entity before to attach to (i.e., an arc is selected), selects an entity after to attach to (i.e., an arc is selected), and an arc solution angle of less than 180 degrees or greater than 180 degrees. When an arc is fit between two other arcs, the user specifies whether the arc is compound or reverse to the arc before. Finally, the user specifies the radius.

In this particular case, there is no automatic rubber-band. The user can type a radius value in, or select two points on the screen to specify the radius. The arc preview only occurs if the user has selected the first point on the screen, either by picking or by entering a coordinate, then as a rubber band is drawn to the cursor from the selected point, the arc preview appears. The user then specifies a second point, which can be entered as a 2D coordinate input, either directly or through the use of transparent commands.

2. Free Arc Between Two Arcs Pass-Through Point. The user selects an entity before to attach to (i.e., an arc is selected), selects an entity after to attach to (i.e., an arc is selected), and specifies a pass-through point.

Since there is only one unique solution for any given pass-through point, no other prompts are necessary and a screen preview is possible. The point entered can be a two-dimensional (2D) coordinate input, either directly, or through the use of transparent commands.

Free Arc Between Two Arcs Editing

For an arc through a pass-through point, the pass-through point can be modified to determining the location and radius of the arc.

For an arc determined by the radius, where the user must specify the compound or reverse parameters, and/or less than or greater than 180 degrees, any one of these parameters can be modified, which determine what the solution is.

In either case, editing either arc that the free arc is attached to affects the location of the arc. If the arc is defined by radius, the radius and additional parameters are held while the attached line or arc is being edited. If the arc is defined by a pass-through point, the pass-through point is held while line or arc is being edited.

SAS (Spiral-Arc-Spiral) Free Arc Group

This section describes the addition of a free arc (including spiral in and spiral out) between two entities. It is similar to the free arc by radius between two entities, with the addition of a transition spiral in and a transition spiral out.

The prompts for the creation for the SAS arc group will be identical to the free arc by radius between two tangents (even when attaching to a tangent/arc or arc/arc). The only difference in the prompting is as follows.

The user specifies a spiral length in numerically or by picking two points on the screen. Depending on the method chosen to specify the spiral parameter for the spiral in above, the prompt for the spiral out will change to the same default input type, and default to the same parameter value entered for the first spiral. However, the user can specify the spiral out length. Thereafter, the user specifies whether the curve is greater or less than 180 degrees.

SAS (Spiral-Arc-Spiral) Free Arc Group Creation

In all cases, the prompts for the creation of the SAS free arc group will be identical to the creation of a free arc by radius between any combination of tangents and arc listed in the sections above. The only difference is the prompts to provide parameters for the creation of the spirals in and out.

SAS Arc Group Between Two Tangents

When placing an SAS arc group between two tangents, the resulting spirals will automatically be "simple," as compared to "compound."

Simple spirals are spirals wherein one end (i.e., the large radius end) has an infinite radius, and the other end (i.e., the small radius end) has a finite radius. This is the most common application of a spiral. In this case, it provides a smooth change from a tangent (infinite radius end) to an arc (finite radius end).

A compound spiral is effectively a simple spiral with a portion of its infinite radius end trimmed off. One end (i.e., the large radius end) has a finite radius, while the other end (i.e., the small radius end) has a finite radius that is less than the other end. The compound spiral is typically used to provide a smooth transition between two arcs of differing radius.

SAS Arc Group Between an Arc and a Tangent.

When placing an SAS arc group between a tangent and an arc (in any order), the resulting spiral attached to the tangent will be "simple", and the spiral attached to the arc will be "compound".

An SAS arc group can only be placed in a configuration such that the attachment to the arc forms a compound arc-arc situation (as opposed to reverse).

SAS Arc Group Between Two Arcs.

When placing an SAS arc group between two arcs, the resulting spirals will automatically be "compound".

An SAS arc group can only be placed in a configuration such that the attachment to either arc forms a compound arc-arc situation (as opposed to reverse).

Logic of the Present Invention

Figure 18:
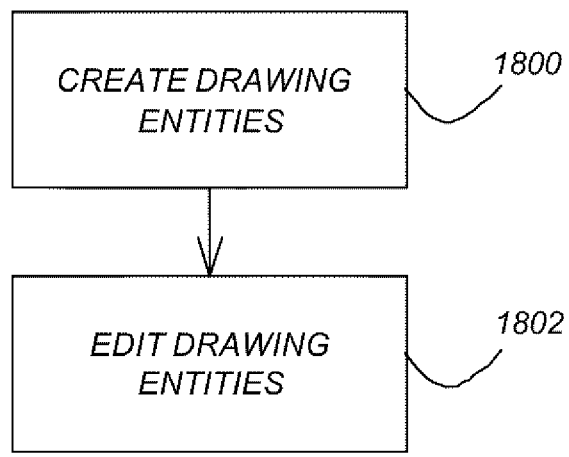
FIG. 18 is a flowchart that illustrates the logic performed by the graphics program according to the preferred embodiment of the present invention.

FIG. 18 is a flowchart that illustrates the logic performed by the graphics program 108 according to the preferred embodiment of the present invention. Specifically, the flowchart illustrates the logic of creating and editing interactive constraint-based alignment objects in a computer-implemented graphics system.

Block 1800 represents creating one or more drawing entities in the graphics system, wherein the drawing entities are linked together as an alignment object, and one or more of the entities includes a persistent tangency rule.

Block 1802 represents editing the drawing entities in the graphics system, wherein the persistent tangency rules affect the drawing entities' geometry while the drawing entities are being edited.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any graphics program, function, or system could benefit from the present invention. Moreover, a system other than a CAD/GIS system could benefit from this invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto and the equivalents thereof.

What is claimed is:

1. A method of creating and editing interactive constraint-based alignment objects in a computer-implemented graphics system, comprising:
  (a) creating a first drawing entity and one or more second drawing entities in the graphics system, wherein the first and second drawing entities are linked together as an alignment object, and the first drawing entity includes a persistent tangency rule related to one or more of the second drawing entities, wherein the persistent tangency rule comprises (1) the first drawing entity being a fixed entity not dependent on tangency to any of the second drawing entities to define the fixed entity's geometry, (2) the first drawing entity being a floating entity dependent on tangency to one of the second drawing entities before or after the floating entity to define the floating entity's geometry, and (3) the first drawing entity being a free entity dependent on tangency to two of the second drawing entities before and after the free entity to define the free entity's geometry;
  (b) editing the one or more of the second drawing entities, without editing the first drawing entity, in the graphics system, after the first and second drawing entities have been created, wherein the persistent tangency rule results in the first drawing entity's geometry being affected in response to the one or more second drawing entities being edited, such that the first drawing entity with the persistent tangency rule is dependent on the one or more second drawing entities being edited to define the first drawing entity's geometry; and
  (c) displaying the first and second drawing entities on the graphics system.

2. The method of claim 1, wherein the first or second drawing entities comprise lines, arcs or spirals.

3. The method of claim 1, further comprising one or more third drawing entities that is a fixed entity that is not dependent on tangency to any other entity attached to the fixed entity to define the fixed entity's geometry.

4. The method of claim 1, further comprising one or more third drawing entities that is a fixed entity and a geometric definition of the fixed entity has no dependency on any other entities, but other entities can depend on the fixed entity.

5. The method of claim 1, wherein a geometric definition of the floating entity includes a tangency dependency on one other second drawing entity attached before or after the floating entity.

6. The method of claim 5, wherein other floating or free entities are dependent on the floating entity.

7. The method of claim 1, wherein no other second drawing entities are dependent on the free entity.

8. The method of claim 1, wherein editing the free entity does not directly affect the geometry of the second drawing entities that the free entity is attached to.

9. The method of claim 1, wherein a geometric definition of the free entity includes a tangency dependency on one second drawing entity attached before the free entity and one second drawing entity attached after the free entity.

10. The method of claim 9, wherein no other second drawing entities are dependent on the free entity.

11. The method of claim 9, wherein editing the free entity does not directly affect the geometry of the second drawing entities that the free entity is attached to.

12. The method of claim 1, wherein each of the first and second drawing entities includes other persistent attributes related to how the first or second drawing entity was created.

13. An apparatus for creating and editing interactive constraint-based alignment objects in a computer-implemented graphics system, comprising:
  a computer system having a memory and a data storage device coupled thereto;
  means, performed by the computer system, for:
    (a) creating a first drawing entity and one or more second drawing entities in the graphics system, wherein the first and second drawing entities are linked together as an alignment object, and the first drawing entity includes a persistent tangency rule related to one or more of the second drawing entities, wherein the persistent tangency rule comprises (1) the first drawing entity being a fixed entity not dependent on tangency to any of the second drawing entities to define the fixed entity's geometry, (2) the first drawing entity being a floating entity dependent on tangency to one of the second drawing entities before or after the floating entity to define the floating entity's geometry, and (3) the first drawing entity being a free entity dependent on tangency to two of the second drawing entities before and after the free entity to define the free entity's geometry;
    (b) editing the one or more the second drawing entities, without editing the first drawing entity, in the graphics system, after the first and second drawing entities have been created, wherein the persistent tangency rule results in the first drawing entity's geometry being affected in response to the one or more second drawing entities being edited, such that the first drawing entity with the persistent tangency rule is dependent on the one or more second drawing entities being edited to define the first drawing entity's geometry; and
    (c) displaying the first and second drawing entities on the computer system.

14. The apparatus of claim 13, wherein the first or second drawing entities comprise lines, arcs or spirals.

15. The apparatus of claim 13, further comprising one or more third drawing entities that is a fixed entity that is not dependent on tangency to any other entity attached to the fixed entity to define its geometry.

16. The apparatus of claim 13, further comprising one or more third drawing entities that is a fixed entity and a geometric definition of the fixed entity has no dependency on any other entities, but other entities can depend on the fixed entity.

17. The apparatus of claim 13, wherein a geometric definition of the floating entity includes a tangency dependency on one other second drawing entity attached before or after the floating entity.

18. The apparatus of claim 17, wherein other floating or free entities are dependent on the floating entity.

19. The apparatus of claim 13, wherein no other second drawing entities are dependent on the free entity.

20. The apparatus of claim 13, wherein editing the free entity does not directly affect the geometry of the second drawing entities that the free entity is attached to.

21. The apparatus of claim 13, wherein a geometric definition of the free entity includes a tangency dependency on one second drawing entity attached before the free entity and one second drawing entity attached after the free entity.

22. The apparatus of claim 21, wherein no other second drawing entities are dependent on the free entity.

23. The apparatus of claim 21, wherein editing the free entity does not directly affect the geometry of the second drawing entities that the free entity is attached to.

24. The apparatus of claim 13, wherein each of the first and second drawing entities includes other persistent attributes related to how the first or second drawing entity was created.

25. An article of manufacture comprising a program storage device embodying instructions that, when read and executed by a computer-implemented graphics system, results in the computer-implemented graphics system performing a method for creating and editing interactive constraint-based alignment objects, comprising:

(a) creating a first drawing entity and one or more second drawing entities in the graphics system, wherein the first and second drawing entities are linked together as an alignment object, and the first drawing entity includes a persistent tangency rule related to one or more of the second drawing entities, wherein the persistent tangency rule comprises (1) the first drawing entity being a fixed entity not dependent on tangency to any of the second drawing entities to define the fixed entity's geometry, (2) the first drawing entity being a floating entity dependent on tangency to one of the second drawing entities before or after the floating entity to define the floating entity's geometry, and (3) the first drawing entity being a free entity dependent on tangency to two of the second drawing entities before and after the free entity to define the free entity's geometry;

(b) editing the one or more of the second drawing entities, without editing the first drawing entity, in the graphics system, after the first and second drawing entities have been created, wherein the persistent tangency rule results in the first drawing entity's geometry being affected in response to the one or more second drawing entities being edited, such that the first drawing entity with the persistent tangency rule is dependent on the one or more second drawing entities being edited to define the first drawing entity's geometry; and (c) displaying the first and second drawing entities on the graphics system.

26. The article of claim 25, wherein the first or second drawing entities comprise lines, arcs or spirals.

27. The article of claim 25, wherein further comprising one or more third drawing entities that is a fixed entity that is not dependent on tangency to any other entity attached to the fixed entity to define the fixed entity's geometry.

28. The article of claim 25, wherein further comprising one or more third drawing entities that is a fixed entity and a geometric definition of the fixed entity has no dependency on any other entities, but other entities can depend on the fixed entity.

29. The article of claim 25, wherein a geometric definition of the floating entity includes a tangency dependency on one other second drawing entity attached before or after the floating entity.

30. The article of claim 29, wherein other floating or free entities are dependent on the floating entity.

31. The article of claim 25, wherein no other second drawing entities are dependent on the free entity.

32. The article of claim 25, wherein editing the free entity does not directly affect the geometry of the second drawing entities that the free entity is attached to.

33. The article of claim 25, wherein a geometric definition of the free entity includes a tangency dependency on one second drawing entity attached before the free entity and one second drawing entity attached after the free entity.

34. The article of claim 33, wherein no other second drawing entities are dependent on the free entity.

35. The article of claim 33, wherein editing the free entity does not directly affect the geometry of the second drawing entities that the free entity is attached to.

36. The article of claim 25, wherein each of the first and second drawing entities includes other persistent attributes related to how the first or second drawing entity was created.

* * * * *